July 30, 1963 HARUMI SAKATANI 3,099,122
LAWN MOWER CATCHER HOOD
Filed June 19, 1961 2 Sheets-Sheet 1

INVENTOR.
HARUMI SAKATANI
BY *Boniard I. Brown*
ATTORNEY

July 30, 1963 HARUMI SAKATANI 3,099,122
LAWN MOWER CATCHER HOOD
Filed June 19, 1961 2 Sheets-Sheet 2
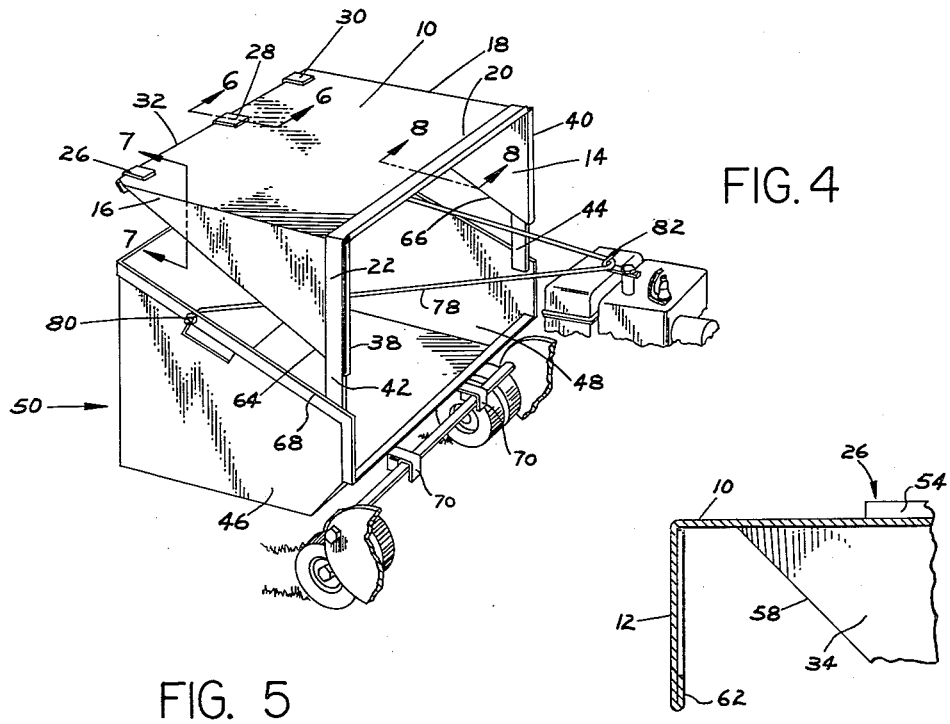
FIG. 4
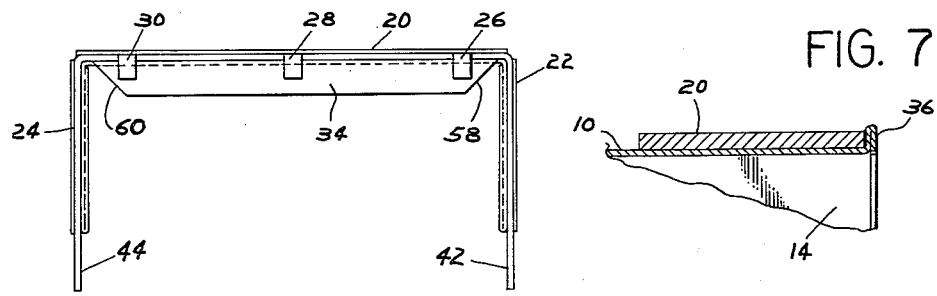
FIG. 5
FIG. 7
FIG. 8
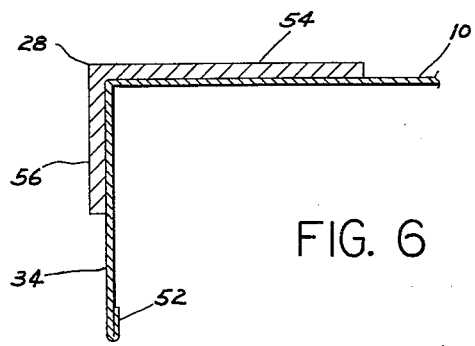
FIG. 6
*INVENTOR.*
HARUMI SAKATANI
BY
ATTORNEY

United States Patent Office 3,099,122
Patented July 30, 1963

3,099,122
LAWN MOWER CATCHER HOOD
Harumi Sakatani, 4432 N. Center St.,
Baldwin Park, Calif.
Filed June 19, 1961, Ser. No. 118,029
5 Claims. (Cl. 56—199)

The present invention relates generally to hoods for lawn mower grass catchers; more particularly, the invention relates to a lawn mower catcher hood for front cutting reel lawn mowers which is freely retained so that it is readily removed and installed.

A variety of grass catchers for lawn mowers have heretofore been utilized for collecting grass cuttings, leaves and the like which otherwise would be thrown upon the lawn or other area on which the mower is operating. Such catchers are ordinarily removable so that they may be unloaded at intervals during the operation of the mower. In order to prevent the discharge of cuttings, leaves and the like over the walls of a grass catcher, as they are thrown by the cutting reel of the mower, enclosed catcher housings and certain hoods for particular types of catchers have heretofore been utilized. Such housings and hoods have conventionally required the use of tools to remove and to replace the hood for the removal of grass, leaves and the like and/or have required fastening devices for this purpose. Tools cannot conveniently be carried by the operator of a power mower. Such tools are relatively heavy and can only be carried in a practical manner in the pockets of the operator's garments. Prior art devices have often required considerable skill, time and effort of the operator for the removal or opening of a catcher or hood for periodic removal of cuttings. For these reasons, open grass catchers have been widely used, with the attendant disadvantage that grass, leaves and the like are discharged over the walls of the catcher and onto the lawn or area being cut, thereby necessitating clean-up work such as raking or sweeping. The time, work and expense involved in the cutting and cleaning of lawns is thereby increased.

There has existed particular need for a simple and effective grass catcher hood for use with power mowers having front cutting reels. This type of mower tends to throw considerable grass, leaves and the like forward of the mower, and considerable quantities are discharged over the sides of grass catchers due to the making of relatively sharp turns by such mowers.

The present invention provides a mower catcher hood for preventing the discharge over the walls of a catcher of cuttings, leaves and the like which are thrown by the cutting reel of the mower. The hood is particularly adapted for use on catchers which extend forwardly of mowers which have front cutting reels. The grass catcher hood comprises a horizontally disposed upper panel, from the leading edge of which a retaining flange extends downwardly for engagement with a front wall of the grass catcher. The trailing edge portion of the upper panel rests on a rod which extends from retaining means on the mower to the catcher to attach the catcher to the mower. Side panels depend from the side edges of the upper panel and conform to the configurations of side walls of the catcher. Retaining elements or keys depend from the trailing ends of these side panels and are adapted for engagement with the side walls of the grass catcher. Retaining elements are preferably provided at the leading and the trailing edges of the hood. The retaining flange and the retaining elements or keys freely retain the hood in its operative position upon the grass catcher, without requiring any fasteners or tools for this purpose, from which operative position the hood may be removed merely by lifting, and into which position the hood may be installed or placed merely by lowering it into position.

The invention therefore provides a simplified and improved lawn mower catcher hood which has particular utility with mowers of the front cutting reel type. It is conveniently and easily installable and removable by unskilled personnel without requiring any tools or fastening devices. It may be installed merely by lowering it into position on a grass catcher, and may be readily removed merely by raising it from the catcher. In its operative position, the hood is so positioned relative to the cutting reel of the mower that substantially all cuttings, leaves and the like are prevented from being discharged onto a lawn. It greatly reduces the time, work and expense involved in clean-up work, such as raking or sweeping. The hood enables a catcher to hold a considerably greater quantity of grass, leaves and the like.

It is therefore an object of the present invention to provide a novel and improved lawn mower catcher hood.

An object of the invention is the provision of a lawn mower catcher hood in accordance with the foregoing object, which is particularly adapted for use with power lawn mowers of the front-cutting reel type.

It is an object of the invention to provide a lawn mower catcher hood which is readily installable merely by lowering it into position on a grass catcher, and which is readily removable by lifting it from the grass catcher.

An object of this invention is to provide a lawn mower catcher hood in accordance with the foregoing object, which requires no tools or fastening devices for installation or removal.

It is an object of the present invention to provide a lawn mower catcher hood of simple and economical construction.

An object of this invention is the provision of a lawn mower catcher hood which enables a catcher to retain a greatly increased quantity of grass cuttings, leaves and the like.

It is an object of the invention to provide a lawn mower catcher hood which substantially reduces the time, work and expense involved in the cutting of lawns, by eliminating considerable clean-up work, such as raking and sweeping.

Other objects, features and advantages of the present invention will become apparent to those versed in the art from a consideration of the following description, the appended claims and the accompanying drawings, in which:

FIGURE 4 is a perspective view showing the conventional grass catcher with the hood of the invention positioned above the grass catcher during the installation of the hood;

FIGURE 5 is a front elevational view of the grass catcher hood of the invention;

FIGURE 6 is an enlarged fragmentary sectional view through the leading edge or corner of the hood, taken at line 6—6 of FIGURE 4, and showing details of the reinforcing angle bar;

FIGURE 7 is an enlarged fragmentary sectional view through the leading corner or edge of the hood, taken at line 7—7 of FIGURE 4; and FIGURE 8 is an enlarged fragmentary sectional view through the upper trailing end portion of the hood, taken at line 8—8 of FIGURE 4.

Figure 1:
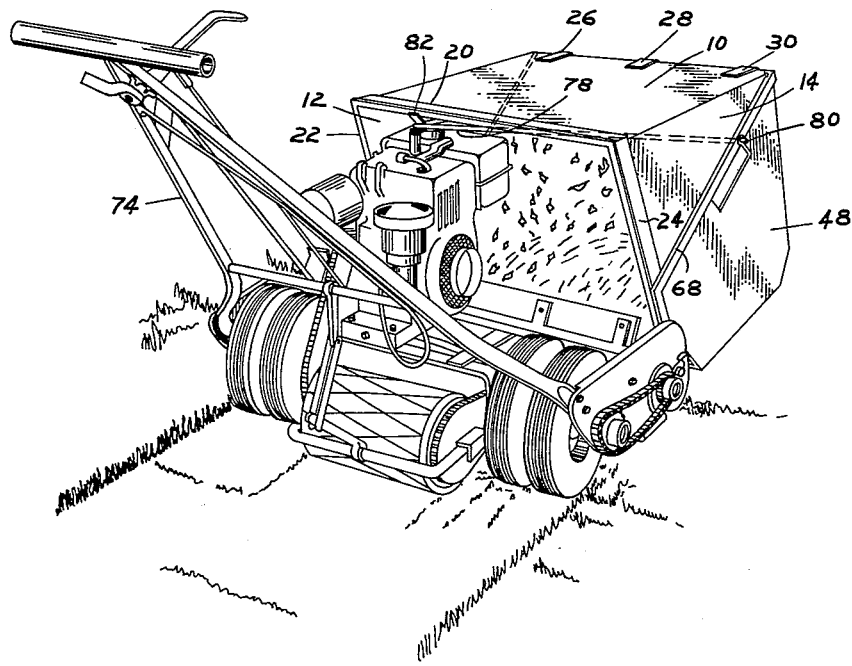
FIGURE 1 is a perspective view of a power mower of the front-reel type to which is attached a grass catcher on which the improved grass catcher hood of the invention is operatively positioned.

Referring to the drawings, and particularly to FIGURES 1 and 4 through 7, there is shown a preferred embodiment of the lawn mower catcher hood of the present invention. The hood includes an upper horizontally disposed panel 10 and depending triangular-shaped side panels 12, 14 extending downwardly from side edges 16, 18 of the panel 10. A heavy reinforcing bar 20 is secured as by welding ot the trailing edge of the panel 10 and has depending sections 22, 24 disposed on the edge portions of the side panels. Angle bars 26, 28, 30 are secured as by welding at the leading edge 32 of panel 10, and the angle bars extend downwardly over and reinforce a transverse retaining flange 34, which is formed integrally with the panel 10 and depends from the leading edge of the panel.

Referring to FIGURE 8, the trailing edge portion of panel 10 is bent into the configuration shown to provide structural strength, the bent portion extending approximately to the level of the upper surface of the bar 20. The trailing end portions of the side panels 12, 14 are similarly bent, as indicated at 38 and 40, to provide structural reinforcement. The depending sections 22, 24 of the reinforcing bar 20 extend downwardly beyond the side panels 12, 14 to form or provide retaining keys 42, 44 which are adapted to slide within side walls 46, 48 of the grass catcher for a purpose which is hereinafter described.

The retaining flange 34 extends downwardly from the leading edge 32 of panel 10, and its lower end portion is bent or folded, as indicated at 52 in FIGURE 6, to provide structural reinforcement. The retaining flange 34 is further strengthened or reinforced by the angle bars 26, 28, 30, each of which has a horizontally disposed arm on the upper panel 10 and a vertically disposed leg on the retaining panel. As indicated at 58 and 60, the retaining flange is preferably tapered or inclined at its ends.

The lower edges of side panels 12, 14 are similarly folded or bent to provide reinforcement, as indicated at 62 in FIGURE 7. The lower edges 64, 66 of the side panels are formed or disposed at an angle which corresponds with the angular configuration of the upper edges 68 of the side walls 46, 48 of a grass catcher 50. The hood is adapted for use with a grass catcher 50 which is used with a conventional power mower of the front cutting-reel type. The catcher is provided with clips 70 which extend over and engage a rod 72 on the mower 74, which has a front cutting reel 76. The grass catcher is suspended by means of a V-shaped rod 78, which has bent portions extending into openings 80 in the side walls 46, 48, and which is engaged at its apex with a hook 82 on the engine of the mower.

Figures 2, 3:
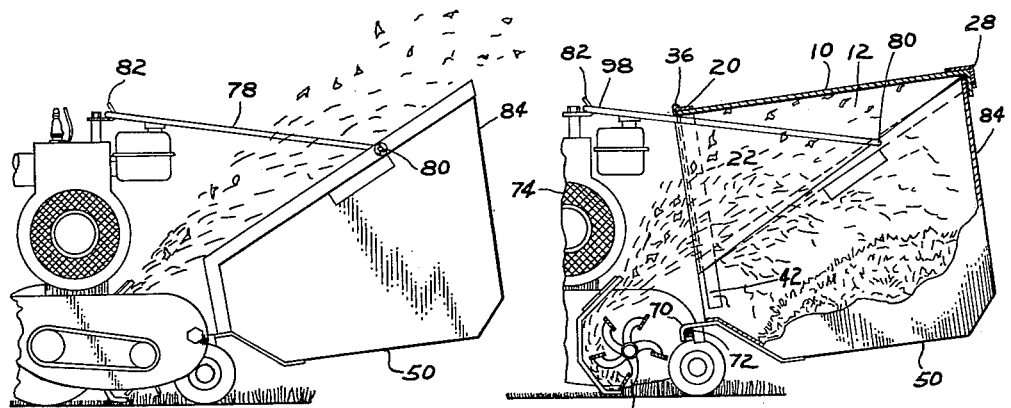
FIGURE 2 is a partial side elevational view of the mower and grass catcher of FIGURE 1 with the hood removed, illustrating the discharge of grass cuttings from the cutting reel over the walls of the catcher during the operation of the mower.
FIGURE 3 is a partial elevational sectional view of the mower of FIGURE 1, showing the hood positioned on the grass catcher and illustrating the trapping of cut grass and the like by the hood during the operation of the mower.

In use, the hood is positioned with the retaining keys 42, 44 engaging the inside surfaces of the side walls 46, 48 of the grass catcher, and with the retaining flange 34 extending over and engaging the front surface of front wall 84 of the catcher. The trailing edge portion of the upper panel 10 rests upon the rod 78, as illustrated in FIGURES 1, 3 and 4. Thus, the retaining keys, the retaining flange and the rod cooperate to retain the hood in its operative position on the grass catcher. Grass cuttings, leaves and the like are prevented from being discharged over the walls of the grass catcher, as indicated in FIGURE 3. The reinforcing bar 20, in addition to providing structural strength, provides additional weight for the hood to prevent its bouncing relative to the catcher during the operation of the mower.

To remove the hood from the catcher, it is only necessary to lift the trailing edge of the upper panel 10 and to grasp the retaining flange 34 at the leading edge of the panel, and to lift upward. In replacing the hood, the trailing edge of the panel 10 and the leading edge of the panel or the retaining flange 34 are grasped in the same manner, and the hood is lowered into operative position on the grass catcher.

From the foregoing description and from the drawings, it will be understood that the hood of the invention may be rapidly and conveniently installed in a free operative position on a grass catcher, to prevent the escape or discharge of grass cuttings, leaves and the like from the catcher during the operation of the mower. It will be understood that the hood may be readily and easily removed from the catcher merely by lifting it from its free operative position. The hood extends and is supported in such a position relative to the cutting reel that it catches substantially all cuttings, leaves and the like. No tool and no fastening device is required for installing or removing the hood.

Those versed in the art will appreciate that the present invention achieves the objects and realizes the advantages hereinbefore mentioned. An extraordinarily effective hood is provided. It is of simplified construction and is relatively inexpensive to fabricate. The hood is conveniently and easily installed on a grass catcher, and is readily removable, without requiring any tool or fastening device. The hood is particularly adapted for power mowers of the front cutting-reel type. The hood greatly reduces the time, work and cost involved in lawn-cutting, because it greatly reduces the time and work otherwise required for cleaning up grass cuttings, leaves and the like which would otherwise be discharged onto a lawn. The hood enables a catcher on which it is utilized to retain and carry thirty percent or forty percent more cuttings and the like.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. A lawn mower catcher hood comprising a substantially horizontally disposed upper panel, retaining means depending from the leading edge of said upper panel and positioned for engagement with a front wall of the grass catcher to retain the hood in operative position upon the grass catcher, side panels depending from side edges of the upper panel, and retaining elements depending from the trailing ends of the respective side panels and positioned for engagement with side walls of a grass catcher to retain the hood in operative position upon the grass catcher, whereby the hood is retained upon the catcher in such manner that it is removable by lifting and is installable by lowering.

2. For use on a catcher which extends forwardly of a mower having a front cutting reel and which is attached to the mower by rod means, a hood for preventing the discharge over walls of the catcher of cuttings thrown by the cutting reel, said hood comprising a substantially horizontally disposed upper panel having a leading edge and a trailing edge, the trailing edge portion of said upper panel resting upon said rod means, retaining means depending from the leading edge of the upper panel to extend over and engage a front wall of the grass catcher, side panels depending from side edges of the upper panel, and retaining elements depending from the trailing ends of the respective side panels and engaging side walls of the grass catcher, said retaining elements and said retaining flange thereby retaining the hood in operative position upon the grass catcher.

3. For use on a catcher which extends forwardly of a mower having a front cutting reel and which is attached to the mower by rod means, a hood for preventing the discharge over walls of the catcher of cuttings thrown by the cutting reel, said hood comprising a horizontally disposed upper panel, reinforcing means on the leading and trailing edges of the upper panel, the trailing edge portion of the upper panel resting upon said rod means, a transverse retaining flange depending from the leading edge of the upper panel to extend over and engage a front wall of the grass catcher, triangular side panels depending from the side edges of the upper panel, and retaining keys extending downwardly from the trailing ends of said side panels and engaging side walls of the grass catcher, said retaining keys and said retaining flange thereby retaining the hood in operative position upon the grass catcher, whereby the hood is removable by lifting and is installable by lowering.

4. For use on a catcher which extends forwardly of a mower having a front cutting reel and which is attached to the mower by rod means, a hood for preventing discharge over the catcher of cuttings thrown by the cutting reel, said hood comprising a substantially horizontally disposed generally rectangular upper panel having a leading edge and a trailing edge, the trailing edge portion of the upper panel being supported by said rod means, triangular side panels depending from the side edges of the upper panel and having their vertexes forwardly extending and adjacent to said leading edge of the upper panel, retaining keys extending downwardly from the trailing ends of the side panels and fitting within side walls of said grass catcher, a retaining flange depending from said leading edge of the upper panel to extend over and engage the front wall of the grass catcher, said retaining keys and said retaining flange thereby retaining the hood in an operative position upon the grass catcher, whereby the hood is removable by lifting and is installable by lowering.

5. In a hood for a grass catcher attached in a forward position to a front cutting reel power mower, the combination comprising a substantially horizontally disposed generally rectangular upper panel having a leading edge and a trailing edge, the trailing edge portion of said upper panel resting upon a rod which extends from retaining means on the mower to the grass catcher to support the catcher, triangular side panels depending from the side edges of the upper panel and having their vertexes forwardly extending and adjacent to said leading edge of the upper panel, a reinforcing bar extending across the trailing edge of the upper panel and extending downwardly along the trailing edges of the side panels, retaining keys extending downwardly from the reinforcing bar and fitting within side walls of said grass catcher, a retaining flange depending from said leading edge of the upper panel to extend over and engage a front wall of the grass catcher, and reinforcing angle bars positioned on the leading edge portion of said upper panel and on the forward side of the retaining flange, said retaining keys and said retaining flange thereby retaining the hood in an operative position upon the grass catcher, whereby the hood is removable by lifting and is installable by lowering.

References Cited in the file of this patent

UNITED STATES PATENTS

| | | |
|---|---|---|
| 459,460 | Powell | Sept. 15, 1891 |
| 2,970,421 | Krewson | Feb. 7, 1961 |